US005457269A

United States Patent [19]

Schonberg

[11] Patent Number: 5,457,269
[45] Date of Patent: Oct. 10, 1995

[54] OXIDIZING ENHANCEMENT ELECTRON BEAM PROCESS AND APPARATUS FOR CONTAMINANT TREATMENT

[75] Inventor: Peter R. Schonberg, Scotts Valley, Calif.

[73] Assignee: Zapit Technology, Inc., Santa Clara, Calif.

[21] Appl. No.: 116,375

[22] Filed: Sep. 3, 1993

Related U.S. Application Data

[63] Continuation-in-part of Ser. No. 62,964, May 14, 1993, Pat. No. 5,378,898, which is a continuation-in-part of Ser. No. 992,614, Dec. 18, 1992, Pat. No. 5,357,291, which is a continuation-in-part of Ser. No. 941,788, Sep. 8, 1992, Pat. No. 5,319,211.

[51] Int. Cl.⁶ ........................................................ C02F 1/30
[52] U.S. Cl. .................. 588/212; 588/219; 588/222; 588/225; 588/227; 588/237; 588/243; 250/492.3; 250/435; 204/157.44; 204/157.63; 210/748; 210/908
[58] Field of Search ........................ 210/748, 747, 210/908; 250/432 R, 435–438, 492.3; 422/186, 186.04; 204/155, 157.44, 157.63, 302; 588/227, 243, 237, 219, 222, 225; 423/240 R, 245.1, 245.3

[56] References Cited

U.S. PATENT DOCUMENTS

| | | | |
|---|---|---|---|
| 2,907,704 | 10/1959 | Trump . | |
| 3,105,733 | 10/1963 | Potapenko . | |
| 3,899,685 | 8/1975 | Francis et al. | 250/536 |
| 3,901,807 | 8/1975 | Trump | 210/198 |
| 4,173,719 | 11/1979 | Tauber et al. | 250/310 |
| 4,265,747 | 5/1981 | Copa et al. | 210/758 |
| 4,396,580 | 8/1983 | Patrick et al. | 422/186 |
| 4,453,079 | 6/1984 | Woodbridge | 250/432 R |
| 4,593,760 | 6/1986 | Visser et al. . | |
| 4,702,808 | 10/1987 | Lemelson . | |
| 4,730,672 | 3/1988 | Payne . | |
| 4,818,355 | 4/1989 | Kanter et al. | 204/170 |
| 4,886,119 | 12/1989 | Bernhardt et al. . | |
| 4,915,916 | 4/1990 | Ito et al. | 422/186 |
| 5,050,676 | 9/1991 | Hess et al. . | |
| 5,076,360 | 12/1991 | Morrow . | |
| 5,120,450 | 6/1992 | Stanley, Jr. | 210/748 |
| 5,172,764 | 12/1992 | Hajali et al. . | |
| 5,190,668 | 3/1993 | Chuang | 210/750 |
| 5,248,395 | 9/1993 | Rastelli et al. | 203/41 |

FOREIGN PATENT DOCUMENTS

| | | |
|---|---|---|
| 31061 | 3/1976 | Japan . |
| 6560 | 2/1982 | Japan . |
| 29084 | 2/1984 | Japan . |
| 164490 | 6/1990 | Japan . |

OTHER PUBLICATIONS

"Advancements of Radiation Induced Degradation of Pollutants in Drinking and Waste Water", Appl. Radiat. Isot. vol. 40 No. pp. 585–594, 1989, N. Getoff, author.

Gehringer et al., "Remediation of Groundwater Polluted with Chlorinated Ethylenes by Ozone–Electron Beam Irradiation Treatment," *Appl. Radiat. Isot.*, vol. 43, No. 9, pp. 1107–1115 (1992).

*Primary Examiner*—Neil McCarthy
*Attorney, Agent, or Firm*—Majestic, Parsons, Siebert & Hsue

[57] ABSTRACT

An electron beam source or generator is described for the treatment of materials, such as toxics, as influent in a reaction chamber. Preferred embodiments of the system include a source of an oxidizing agent in fluid communication with the influent. The oxidizing agent together with a dose of electron beam promotes reaction of the contaminant into less toxic forms so as to provide greatly enhanced destruction of contaminant that are otherwise resistant to oxidizing reactions.

16 Claims, 7 Drawing Sheets

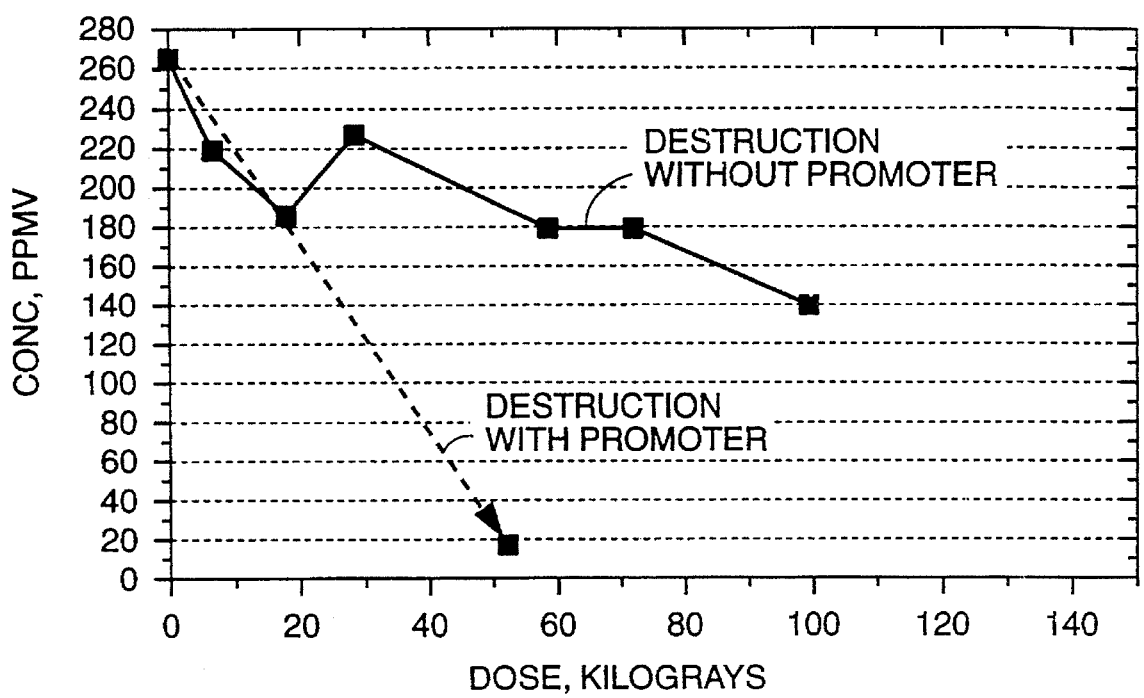
FIG._5
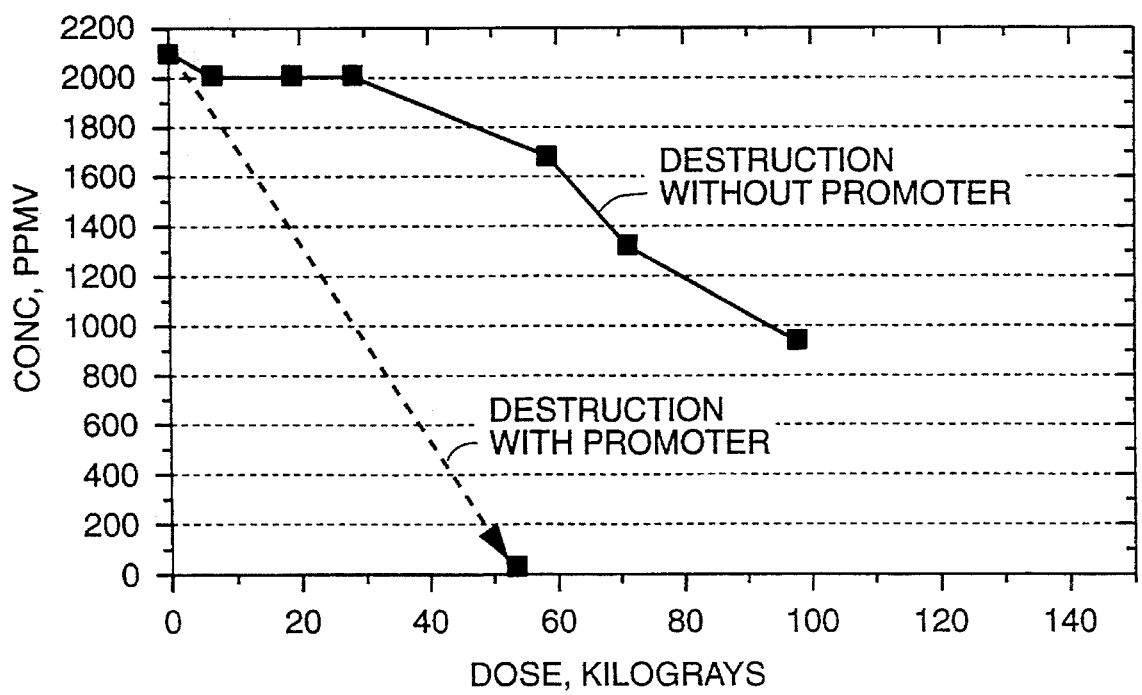
FIG._6

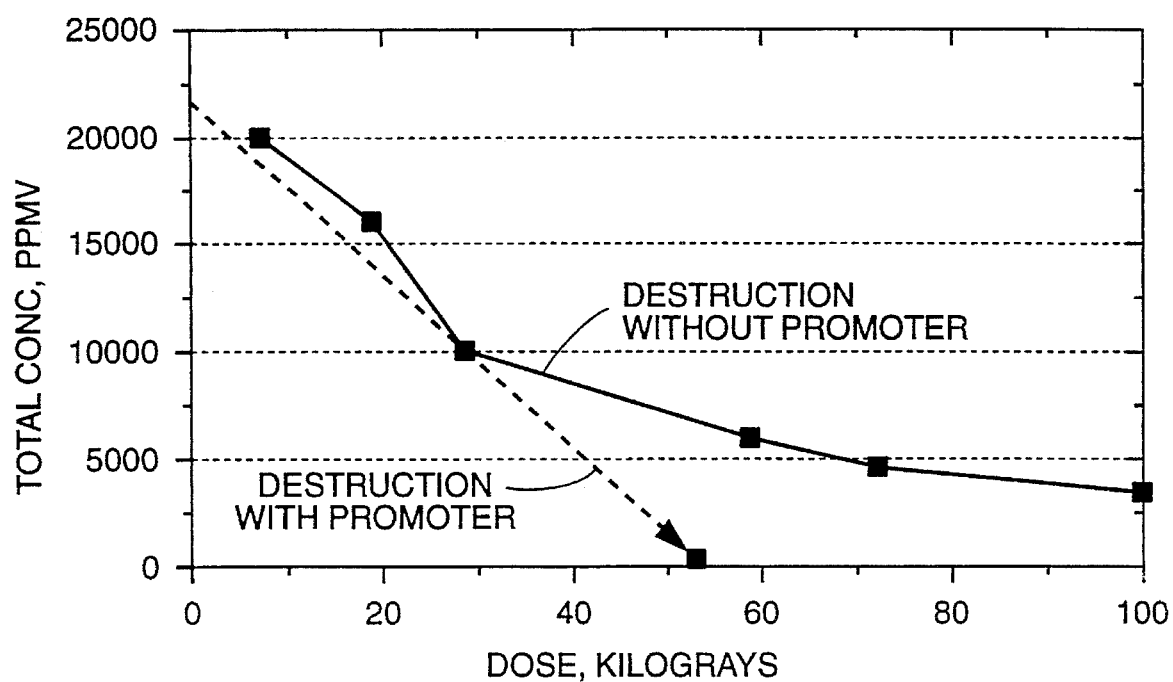
FIG._7

OXIDIZING ENHANCEMENT ELECTRON BEAM PROCESS AND APPARATUS FOR CONTAMINANT TREATMENT

This invention is a continuation-in-part of Ser. No. 08/062,964, filed May 14, 1993, titled "Electron Beam System," which is now U.S. Pat. No. 5,378,898, issued on Jan. 3, 1995, which is a continuation-in-part of Ser. No. 07/992,614, entitled "Transportable Electron Beam System and Method," filed Dec. 18, 1992 which is now U.S. Pat. No. 5,357,291, issued on Oct. 18, 1994 which in turn is a continuation in part of Ser. No. 07/941,788 entitled "Toxic Remediation System and Method" filed Sep. 8, 1992 which is now U.S. Pat. No. 5,319,211, issued on Jun. 7, 1994.

FIELD OF THE INVENTION

This invention generally relates to methods and apparatus for treating and/or chemically converting contaminants in an influent, and more particularly relates to an electron generator or source and processing units used to configure an electron beam system to treat and/or convert contaminants with enhanced results through an advanced oxidation process.

BACKGROUND OF THE INVENTION

Volatile organic compounds such as hydrocarbons (VOCs) pose serious soil and water contamination problems from spills, leakage from storage facilities, or surface discharges. These contaminants can contribute to ground water degradation and can pose a health threat to drinking water supplies. The contaminants can also remain within the vadose zone. Among the VOC contaminants frequently found in the vadose zone and illustrative of the problem are those used in paint manufacture (acetone, methylisobutylketone, methylethylketone, toluene, xylene, mineral spirits, naphtha), halogenated hydrocarbons such as trichloroethylene and perchloroethylene, which are common solvent and cleaning agents, hydrocarbons from petroleum processing or transport, among many others.

A variety of methods have been proposed for recovery of volatile contaminants from the vadose zone. Thus, Isser et al., U.S. Pat. No. 4,593,760, issued Jun. 10, 1986, proposes the use of vacuum extraction. Payne, U.S. Pat. No. 4,730,672, issued Mar. 15, 1988, and Bernhardt et al., U.S. Pat. No. 4,886,119, issued Dec. 12, 1989, also disclose methods and apparatus for driving and collecting volatile contaminants from contaminated soils.

Contaminants are often recovered as both a liquid stream and as gases. Hess et al., U.S. Pat. No. 5,050,676, issued Sep. 24, 1991, Morrow, U.S. Pat. No. 5,076,360, issued Dec. 31, 1991, and Hajali, U.S. Pat. No. 5,172,764, issued Dec. 22, 1992, all address removing contaminants as separate liquid and gas streams.

However, contaminant removal addresses only the first part of the problem. Once removed, disposal (that is, destruction or conversion to non-toxic or less toxic species) requires attention.

High energy electron accelerators have received considerable interest for treating contaminated water. One research group at the University of Florida has studied use of high energy electrons for treating various toxic and hazardous organic chemicals in aqueous solutions. Lawrence Livermore National Laboratory and collaborators have been investigating the decomposition of chlorinated hydrocarbons using x-rays; they have demonstrated the destruction of volatile organic compounds in ground water and for both polychlorinated biphenyls and insecticides in organic solutions. Gehringer et al., Appl. Radiat. Isot., 43 (9), pp. 1107–1115 (1992), discusses the removal of chlorinated ethylenes, such as trichloroethylene and perchloroethylene, in ground water by ozone-electron beam irradiation treatment. However, the destruction of contaminants in water is distinctly different from the problems encountered with contaminants in gas or vapor.

Electron-beam technology has also been suggested for destroying low concentrations of vinyl chloride in carrier gases. Slater et al., J. Appl. Phys., 52 (9), pp. 5820–5828 (1981). However, the chemistry of electron-beam exposure of air is very complex owing to the high energy of the primary electrons and the large number of ionization events created by each primary electron. Electron beam exposure of air probably forms a wide spectrum of excited oxygen and nitrogen species of which some are HO, NO, $NO_2$, $O_3$, and $O_2$ ($^1\Delta^g$). The latter is singlet (molecular) oxygen. These various excited oxygen and nitrogen species also vary greatly in reactive lifetimes.

Prior art electron beam conversion systems were typically designed to fit the composition and flow rate parameters of a single material source. For example, U.S. Pat. No. 4,507,265 describes a power plant effluent gas treatment system in which electron beams convert flowing sulfur oxides and nitrogen oxides into solids and mists for later removal by a dust collector. U.S. Pat. No. 5,015,443, issued May 14, 1991, inventors Ito et al., similarly treats waste gases such as sulfur dioxide and NO with an electron beam where the electron beam is said to form oxygen and hydroxyl radicals from air of the waste gas. This patent also mentions a Japanese patent disclosure said to describe use of atmospheric air introduced into an electron beam reactor to allow the air to be radiated and form ozone and oxygen atoms which is then mixed with a waste gas to oxidize NO.

However, where a conversion facility is dedicated to a single source of material, the reaction chamber and electron beam sources were not designed to accommodate large variations in flow rate or composition. In addition, this prior art technique fails to address the conversion of other toxic materials, such as volatile organic compounds, to relatively benign compounds or elements which can be dealt with by conventional means. Also, these prior art systems have generally been large and immobile and typically have high electric power consumption which is a different type of structure and methodology than that described in the instant application. Further, for some VOC's it is quite difficult to achieve acceptable levels of reduction, even at high applied electron beam dosages.

SUMMARY OF THE INVENTION

In one aspect of the present invention, an electron beam treatment apparatus comprises a reaction chamber, input means for admitting an influent into the reaction chamber, exit means for removing effluent from the reaction chamber, at least one electron beam source associated with the reaction chamber and adapted to admit an electron beam to treat the influent while within the reaction chamber, and a source of promoter adapted to permit introduction of promoter into the influent so that promoter is present during reaction chamber treatment. The influent to be treated includes a contaminant. The promoter is a chemical oxidizing agent, capable of forming free radicals when the contaminant in the influent is subjected to an electron beam dose within the reaction chamber. The inclusion of a promoter enhances destruction of contaminants that are resistant to oxidation during electron beam treatment and permits use of lower and/or shorter electron beam dose levels. Thus, use of the apparatus provides more efficient and economical contaminant treatments.

In another aspect of the present invention, a process for treating an influent volatile organic compound ("VOC"), comprises adding a promoter and exposing the VOC to an electron beam dose. The promoter and electron beam dose are together effective to oxidize the VOC into less toxic reaction product(s) and to reduce the VOC concentration to a selected and accepted value.

Contaminants that are resistant to oxidative destruction, such as certain fluorocarbons, chlorofluorocarbons, and hydrocarbons, have been treated in accordance with this invention to at least about a 95% removal value. For example, gas samples from contaminated soils including the fluorocarbon Freon 113, which is otherwise resistant to oxidizing remediation, has been efficiently removed in accordance with the inventive process by using relatively small amounts of hydrogen peroxide as promoter.

Treatments of a number of VOCs with promoter achieve about a 95% reduction in concentration with an electron dose that was about 10% smaller than the electron dose used for the same beginning concentrations of VOCs without use of promoter and resulting in generally less efficacious reductions. As a consequence, practice of the inventive process is more economical, efficient, and is more effective than use of an electron beam without a promoter.

BRIEF DESCRIPTION OF THE DRAWINGS

FIG. 5 graphically illustrates remediation of gas samples including Freon 113 as contaminant by practice in accordance with the inventive process (with promoter) and for comparison without promoter;

FIG. 6 graphically illustrates remediation of gas samples including 1,1,1-trichloroethane ("1,1,1-TCA") as contaminant by practice in accordance with the inventive process (with promoter) and for comparison without promoter; and FIG. 7 graphically illustrates remediation of gas samples including total hydrocarbon as contaminant by practice in accordance with the inventive process (with promoter) and for comparison without promoter.

Figure 1:
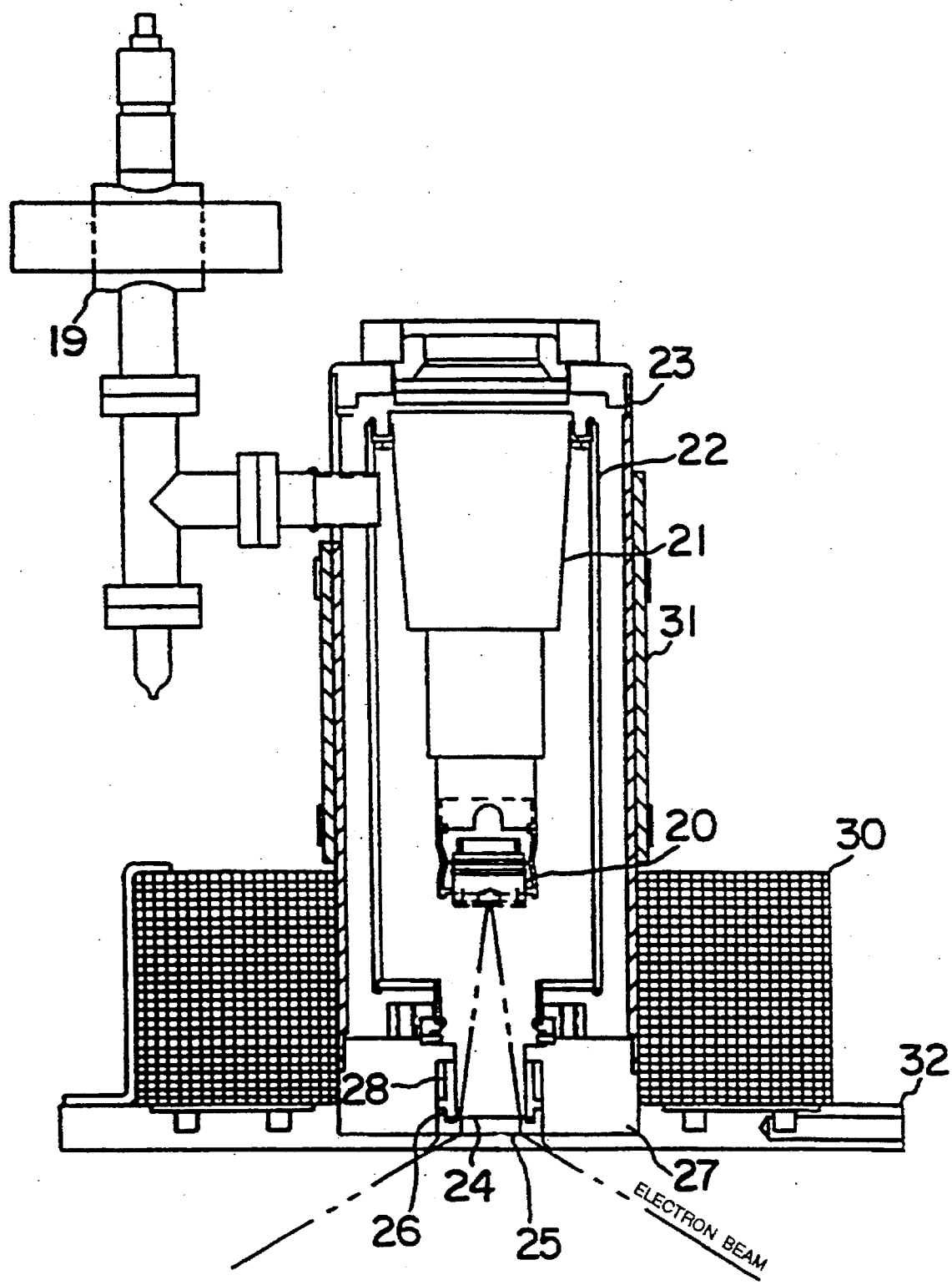
FIG. 1 is a cross-sectional view of a preferred electron beam generator or electron source for practicing the inventive process.

The inventive process is preferably practiced with an electron beam generator and an electron beam processing system, which comprises one or more electron beam sources or generators and associated reaction chamber(s). The processing units can be used singly or in combination with other processing units to create an electron beam reaction system that meets the particular needs of a given application. Each processing unit has means for attaching the reaction chamber inlet either directly to the system inlet or into system preprocessing modules from where the flow will feed to the processing portion for treatment. Alternatively, the inlet flow can be from the outlet of an upstream reaction chamber. Each processing unit also has means for attaching a reaction chamber either directly to the system outlet, through system post-processing modules, or to the inlet of a downstream reaction chamber. In addition, a processing unit has one or more electron beam sources associated therewith, and means for admitting an electron beam into the reaction chamber(s).

Practice of the invention provides improved destruction and removal efficiency ("DRE") of contaminants that are carried by an influent. This influent has a gaseous phase that acts as a mass transfer agent, or carrier, which at least includes a contaminant to be treated. It should be understood that the words "gas," "gaseous," and "gas phase" are used interchangeably to describe the influent carrier, as used in the specification and claims. Such words are intended to encompass an influent of gas or gases, vapor or vapors, colloidal dispersions, foams, fogs, emulsions, aerosols, or combinations thereof, as well as suspended particulates in a supporting material. Thus, the contaminant to be treated may be in gaseous, liquid, or solid (particulate) form and the promoter may be in gas or liquid form. The contaminant is a component of the influent and the contaminant concentration can vary from being a large or a small component.

Although VOCs are particularly contemplated for treatment in practicing the present invention, other contaminants may also be usefully treated. Thus, contaminants such as mercury, lead, cadmium, and other oxidizable inorganics that have some vapor pressure and can be volatilized or suspended in a gas phase, may be treated in accordance with this invention. Once treated in accordance with this process, such inorganic contaminants can then be trapped, and these may appear as particulates, for appropriate disposal.

Concentrations of individual organic species in a mixture with air have been reduced from about 95% to over 99% by including a promoter into the contaminant-containing gas phase together with a sufficient electron beam dose. Practice of the inventive process treats such contaminants in a gas phase by exposure to an electron beam together with the presence of a promoter. The goal of treatments in accordance with the process is to destroy completely these contaminants. It is believed that destruction occurs by means of oxidative reactions through the formation of free radicals; however, it should be understood that treatments in accordance with the inventive process include reduction of contaminant concentrations from initial levels below a target level, such as reductions of about 95% or greater.

An electron beam dose may be measured in kilograys. One kilogray is equal to 1 watt-sec per gram, which is a ratio of power to mass flow. The electron beam dose-destruction characteristics of contaminants such as VOCs are dependent on the makeup and particular characteristics of contaminant mixtures. Different contaminating compounds have been found to have their own dose-destruction curves. Empirical data indicates that concentrations of these contaminants decrease as doses increase and that only very low levels of new volatile compounds appear as by-products.

Practice of the inventive process optimizes or greatly enhances contaminant destruction so that the operation to reduce or eliminate toxics can proceed at significantly improved removal efficiencies. Even use of very small amounts of a promoter with respect to the mass flow rate of the contaminant in accordance with this invention has resulted in significantly enhanced destruction of compounds that are otherwise resistant to oxidative destruction. For example, by use of a promoter in accordance with this invention, and with reference to FIG. 5, a contaminated sample having a Freon 113 concentration of 267 ppmv was reduced to 13 ppmv (about a 95% removal). With reference to FIG. 6, by practice of the inventive process a contaminated gas sample having 1,1,1-TCA concentration initially at 2100 ppmv was reduced to 24 ppmv (almost 99% removal). With reference to FIG. 7, an overall hydrocarbon value of about 22,000 ppmv was reduced to 100 ppmv (about 99.6% removal) by practice of the inventive process.

A preferred embodiment of the electron beam generator is shown in FIG. 1. A high voltage electron gun 20, or a filamentary cathode, is attached by way of a ceramic insulator 21 inside vacuum chamber 22 within the electron beam generator housing 23. Vacuum inside chamber 22 is continuously maintained by means such as ion pump 19. Optionally, gun 20 contains a control grid or electrode that may be used to modulate or control electron flows. The heated cathode emits electrons which form a high current flux that is directed through a passage in the vacuum chamber toward a thin vacuum window 24. The electron beam may be electrostatically and/or electromagnetically focused. However, we prefer that the electrons not be collimated. The material and thickness of the window and its mounting means are carefully selected so as to maintain a hard vacuum, to allow a high percentage of the electrons to pass through, and to conduct or radiate heat generated by that fraction of the beam that is absorbed. Because it needs to be very thin, the window material of choice must also be very strong to resist the effects of thermal cycling and ambient pressure at elevated temperatures.

Yet another consideration in selecting window material and thickness is control of the angle through which the emerging electron beam diverges. Large beam divergence angles maximize the exposed volume of, and minimize the possibility of electron voids in, the reaction chamber. In our preferred embodiment, a Havar or titanium window, in the range of approximately 0.0005 inch to 0.005-inch thick being used. Havar is a material sold by Hamilton Precision Metals, Inc. of 1780 Roherstown Road, Lancaster, Pa. 17604. It is an alloy having the following composition, amounts are nominal and percents are by weight:

cobalt—42%; chromium—19.5%; iron—19.1%; nickel—12.7%; tungsten—2.7%; molybdenum—2.2%; manganese—1.6%; and, carbon—0.2%.

Other materials, including beryllium and stainless steel, are alternates for vacuum window 24 and it should be understood that windows of other thicknesses may also be used in the electron sources of this invention. Optionally, vacuum window 24 can be plated or otherwise coated on the side external to the vacuum to provide resistance to corrosion, for example by a thin layer of gold, ceramic or other corrosion resistant material.

The window disperses the beam through half angles in the range from about a few degrees up to approximately twenty degrees. This angle is a function of the window thickness, window material, and electron beam energy.

Power losses in the window are a non-linear function of the electron beam energy, which in the preferred embodiment is in the range of from 50,000 to 500,000 electron volts. It should be understood that higher beam energies may be used (up to about 10 MeV). Current density and cooling requirements must be considered in determining appropriate operating conditions.

Figure 3A:
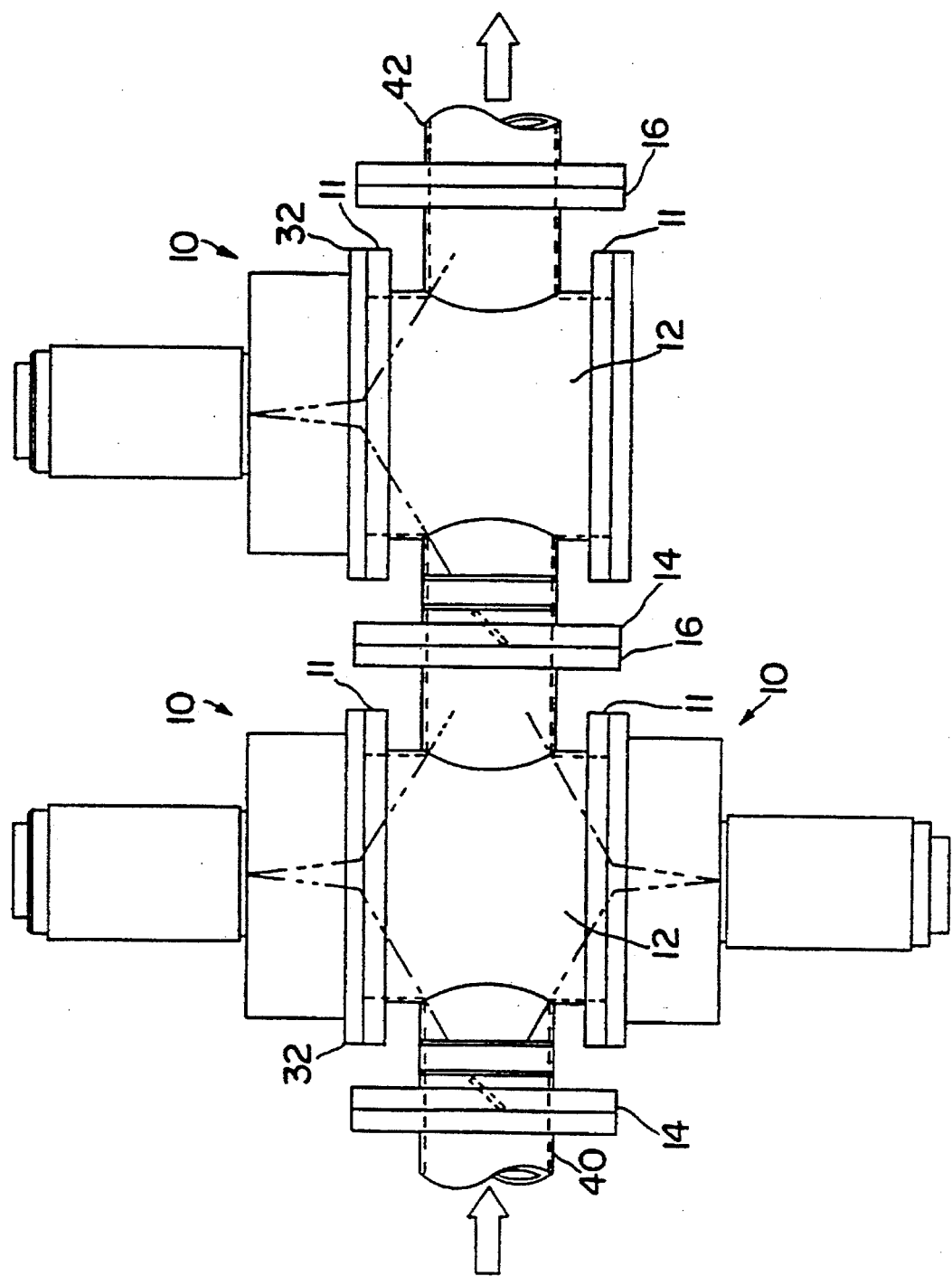
FIG. 3a is a schematic drawing of a series arrangement of processing unit modules like those shown in FIG. 2.

After passing through the window, the beam is passed through secondary window 25 which isolates the vacuum window and acts to scatter the beam as it enters reaction chamber 12 (see FIG. 3a for example). Secondary window 25 functions to expand the emerging angles of the beam as it enters the reaction chamber. The window 25 should be strong, fairly transparent to electrons, and, in combination with vacuum window 24, should produce the desired beam dispersion angle.

Another function of secondary window 25 is to form an impervious chemically resistant barrier isolating vacuum window 24 from the reaction chamber. Materials present in the influent and by-products of certain reactions occurring in the reaction chamber could otherwise rapidly corrode the vacuum window leading to premature system failure.

In a preferred embodiment of the apparatus, a 0.0005 to 0.002 inch thick mica layer is used for secondary window 25 resulting in an electron beam with excellent resistance to corrosive attack and a 120° included angle. Other intended secondary window materials include kapton or sapphire. Alternatively, other materials such as Havar or titanium can be used if plated or otherwise coated on the side facing the contents of the reaction chamber by a thin layer of corrosion-resistant material such as, for example, gold or ceramic.

A metal spool 26 is braced into vacuum window housing 27 to form annulus 28 through which cooling water is pumped. It develops a turbulent flowing pattern as it passes through and carries away heat caused by electrons absorbed in vacuum window 24. Supplemental cooling is provided by a controlled flow of non-reactive gas (nitrogen, helium or argon) which is directed through the gap 29 between window 24 and window 25. In addition to cooling the vacuum window and the secondary window, this gas flow prevents accumulation of ozone in the volume of gap 29, as would occur if air were present in that volume, further preventing corrosive attack of critical system components.

In an alternate embodiment, secondary window 25 may be eliminated. Isolation of the vacuum window 24 from corrosive substances will in this configuration be accomplished by way of a high-flow "curtain" of purge gas which exhausts directly into the reaction chamber, driving those substances away and into the electron beam for treatment. In addition a thin corrosive resistance coating may be applied to the outside of vacuum window 24 to provide further protection.

An optional electromagnetic focus coil 30 may be used to supplement electrostatic techniques of focusing the electron beam, which among other things permits its size (diameter) to be altered and controlled remotely. Beam size is important because it establishes power density at the vacuum window and at the secondary window; the larger the beam diameter, the lower the power density. If an intense beam is focused to a small diameter it may damage window 24 and/or secondary window 25. Focus coil 30 allows tailoring of the electron beam output to the size of the reaction chamber 12. For simple systems, this electromagnet can be replaced by a permanent magnet sized for desired beam output characteristics.

A lead (Pb) shield 31 around the outside of the beam generator attenuates x-rays generated by electron collisions inside the vacuum chamber 22. This preferred embodiment can be altered to use steel, concrete, or other suitable material for radiation shielding. Additional shielding will be added externally as needed to result in a safe operating environment.

The overall electron beam generator assembly is attached to a mounting flange 32. This flange enables bolted attachment to mating flanges 11 (see FIG. 3a) on reaction chamber 12 or other processing device. This modular approach allows for easy maintenance service and facilitates replacement by another electron beam source having different output characteristics. Incorporated into mounting flange 32 is a water cooling path to keep the reaction chamber heat from reaching the electron beam generator.

Figure 2:
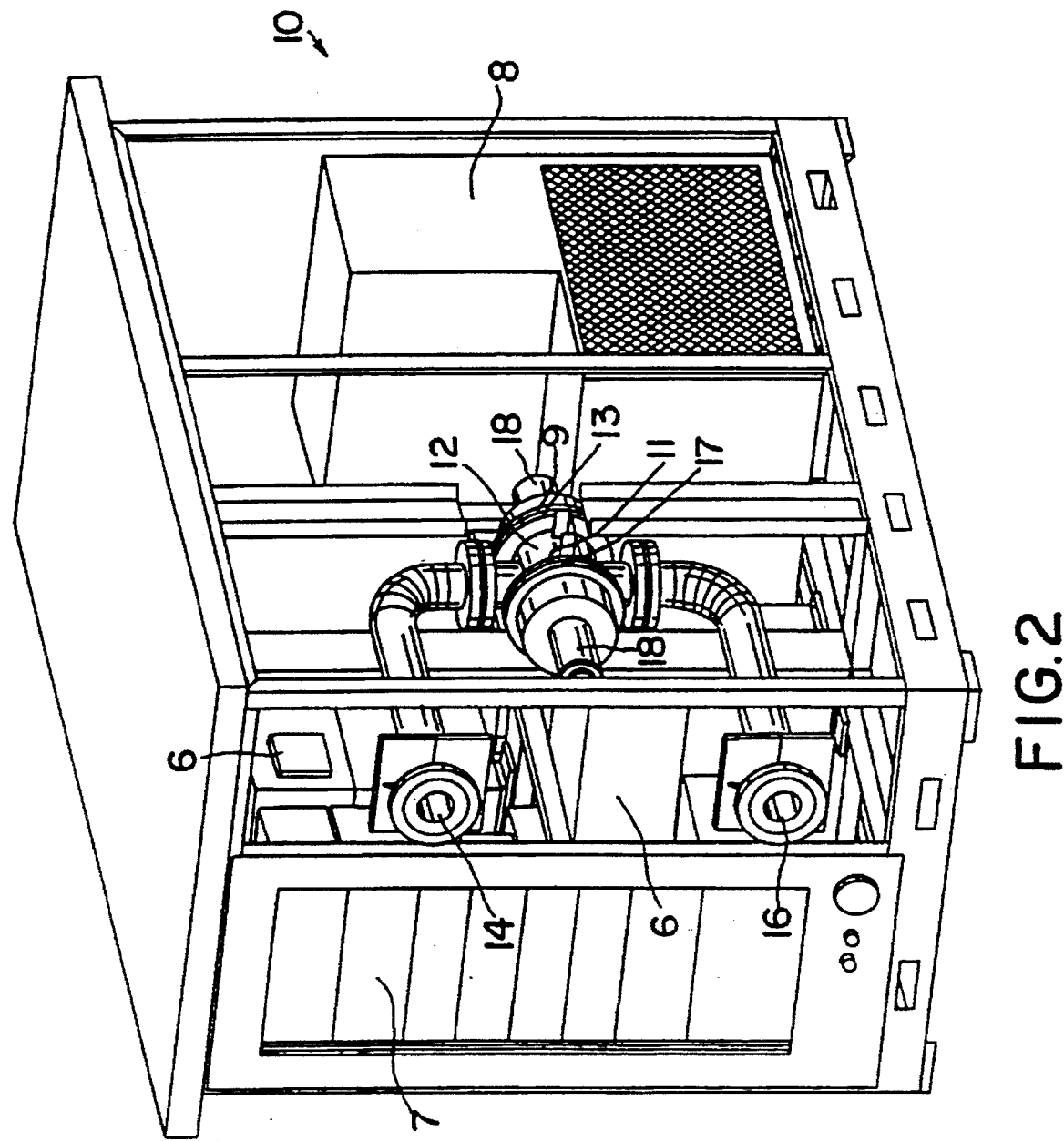
FIG. 2 is a schematic drawing of a processing unit according to a preferred generator embodiment.

A preferred embodiment of the overall processing unit is shown schematically in FIG. 2. Processing unit 10 has a reaction chamber 12, preferably formed as a cylinder formed from Hastelloy C-22. Hastelloy C-22 is available from Corrosion Materials, Inc., P.O. Drawer 666, Baker, La. 70714. Hastelloy C-22 is an alloy that has the following composition, amounts being nominal and percentages being by weight:

nickel—56%; chromium—22%; molybdenum— 13%; tungsten—3.0%; iron—3.0%; cobalt— 2.5%; manganese—0.5% max.; vanadium—0.35% max.; silicon— 0.08% max.; and carbon— 0.010% max.

This material has been selected in recognition of the potentially corrosive atmosphere in the reaction chamber. Other materials (such as polyvinyl chloride, inconel, and austenitic stainless steel) and other chamber body shapes may be used without departing from the scope of this invention depending on the requirements of the intended application. Flanges 14 and 16 extend from the inlet and outlet ends, respectively, of reaction chamber 12. Flanges 14 and 16 serve as means for attaching processing unit 10 to an inflow means feeding influent to the unit for treatment and an outflow means to transfer treated materials to other processing units or to the atmosphere for release, as discussed below.

Electron beam treatment system 10, as shown in FIG. 2, can accommodate influent gas flows of up to about 1,000 cubic feet per minute. With larger diameter pipes system 10 can accommodate flows to about 5,000 cubic feet per minute. Other configurations of piping systems within the scope of this invention can accommodate flow rates of up to about 50,000 cubic feet per minute.

In the preferred embodiment, processing unit 10 has two electron beam sources. It should be understood, however, that the processing unit could use one or more than two electron beam sources. It should be understood that other means for generating electrons may also be used. What is required is a sufficient electron beam energy to penetrate the vacuum window, typically 30 KeV or greater. The current density of the beam incident on the window will generally be less than about 0.2 milliamperes per square centimeter with typical thermal cooling systems for the window as are usually used with this type source. However, it should be understood that with a more effective cooling system the beam current density may be increased. The incident electron beam on the window should be sized so that it will diverge to no more than a half cone angle of about twenty degrees. This will ensure that electrons that penetrate the window do not contribute appreciably to defocusing and divergence after scatter from the window itself. Each electron beam source 18 can supply average electron beam power to about 5 kilowatts, either continuous or pulsed. Higher power sources can also be used (up to the megawatt range).

Electron beams that may be used in practicing this invention include those that are generated by, for example, thermionic devices, plasma generators, and certain corona generators, as well as field emission devices. Pulsed linear accelerators and induction accelerators may also be used as electron sources.

As shown in FIG. 2, two electron beam sources 18 are attached to reaction chamber 12 of the electron beam treatment system 10, preferably by means of flanges 17 and 11 and flanges 9 and 13 on the electron beam sources and on the reaction chamber, respectively. In the event that the system is used with a single electron beam source, the second electron beam source position may be covered by a removable plate attached to flange 13. In this system, influent enters the opening at flange 14 and exits the opening at flange 16. Controls and power supplies 7 drive and control system 10 during operation. The unit includes a heat exchanger 8 for purposes of controlling heat through the system and x-ray high tension supplies 6 to drive the electron beam sources.

A preferred embodiment for the processing unit shown in FIG. 2 is where the unit is constructed to be approximately 4 feet wide by 8 feet long by 5 feet high, and, when containing two electron sources, weighs less than about 4,000 pounds. In general, processing units in accordance with this invention preferably will be less than about 10 feet long in any surface dimension and will weigh less than about 3 tons.

In order to optimize its effectiveness, an electron beam system must be tailored to the treated material's composition and mass flow rate. The electron beam dose required for a particular electron beam application depends on the nature of the material to be treated and the desired chemical transformation of that material. Energy absorbed from the electron beam by the material in the reaction chamber is a function of the power of the electron beam source or sources, the kinetic energy of the electrons in the beam, the spatial distribution of the electrons, the shape and dimensions of the chamber, the mass flow rate of the treated material, the type and concentrations of contaminants, the carrier gas, and the character and mass flow rate of the carrier gas. For a given dose, higher mass flow requires higher electron beam power. For example, at a flow rate of 1,000 cubic feet per minute and beam power of 3 kilowatts delivered to reaction chamber 12, each electron source can administer a treatment dose of about 5 kilograys to the material flowing through reaction chamber 12. Doses up to 100 kilograys or more can be administered if flow is decreased to 50 ft$^3$/min or less.

The upper limit of flow rate through a reaction chamber of given dimensions is defined by the acceptable pressure drop across the reaction chamber due to fluid friction and the maximum electron beam power the system is capable of delivering. Enlarging the reaction chamber in a direction of electron flow requires an increase in electron energy to ensure complete treatment of the material flowing through the reaction chamber. We prefer that the electrons be dispersed so that their trajectories generally match the contours of the reaction chamber. This is believed to provide maximum efficiency of energy transfer from the electrons to the influent being treated. The modular nature of the electron generator described above facilitates the exchange of one electron beam source for another. In addition, fins or other flow directing devices may be added to the interior of the reaction chamber, thereby increasing the interaction between the electron beam and the flowing material.

Figure 3B:
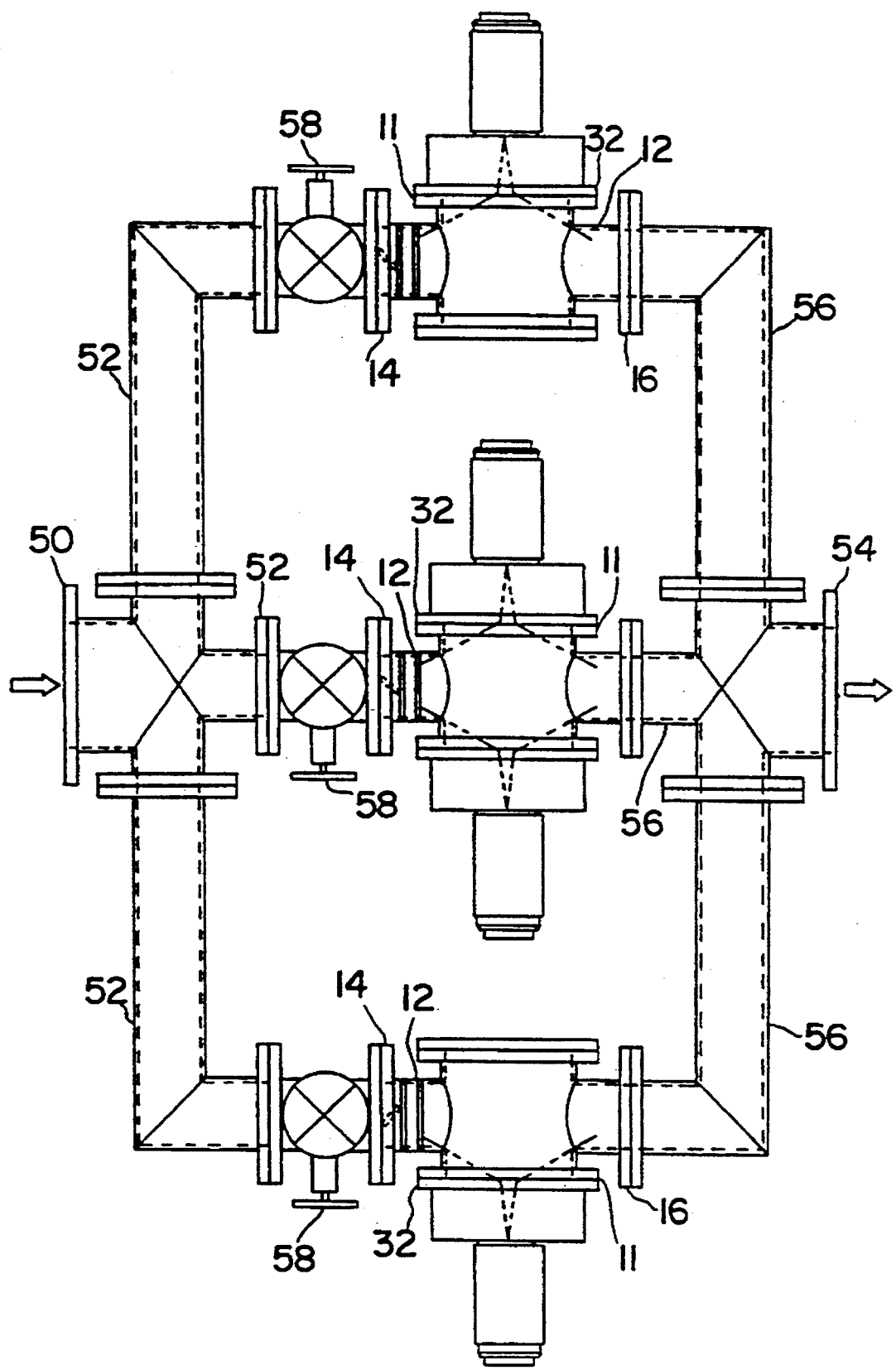
FIG. 3b is a schematic drawing of a parallel arrangement of the processing unit modules like those shown in FIG. 2.

The modular nature of preferred processing units of this invention facilitates alternate configurations of the electron beam system to meet the material treatment needs of a given application according to the design parameters discussed above. FIGS. 3a and 3b show two possible configurations. Other configurations apparent to those skilled in the art are within the scope of this invention.

FIG. 3a is a schematic drawing of a series arrangement of the processing unit modules shown in FIG. 1. As discussed above, the dose delivered by the processing unit module is a function of electron beam power. Assuming that the physical dimensions of the reaction chamber meet the mass flow requirements of the conversion system input, and assuming that the power of the electron beam source is not changed, the dose delivered by the system can be increased incrementally to at least its required level by attaching the modular processing units serially as shown in FIG. 3a. Processing units 10 are connected to each other by means of flanges 14 and 16 or by other suitable connecting means. The inlet flange of the first reaction chamber in the series is attached to a flange on an influent duct 40 which delivers influent gas from the material source directly or via any pre-processing system components such as pumps, filters, moisture traps, and/or thermal devices. The outlet flange of the last reaction chamber in the series is attached to a flange on an effluent duct 42 which removes treated effluent from the system directly or via any post-processing components such as scrubber and/or carbon adsorption containers. Suitable seals or gaskets are disposed between the flanges to prevent leakage.

FIG. 3b is a schematic drawing of a parallel arrangement of the modular processing units of this invention. If the incoming material flow rate exceeds the design flow rate or allowable pressure of the processing unit, the incoming material can be split into two or more separate flows by manifold 50 which delivers influent gas from the material source directly or via any pre-processing components. The inlet flanges 14 or other suitable connecting means of the multiple processing units 10 are attached to flanges on the influent manifold branches 52. Outlet flanges 16 of processing units 10 are attached to flanges on branches 56 of manifold 54 which removes treated effluent from the system directly or via any post-processing components. Valves 58 on influent manifold branches 52 may be used to apportion flow among the branches in any desired ratio.

It is possible, of course, to combine the serial arrangement of FIG. 3a with the parallel arrangement of FIG. 3b in order to meet the dose and flow rate requirements of the treated material source. The invention also simplifies reconfiguration of the system if the material source changes or the site is different.

The modular reaction chamber of this invention may be used in a dedicated, stationary electron beam conversion system. Because it is relatively small and lightweight and because it can be easily reconfigured, the modular reaction chamber of this invention is particularly useful in a transportable electron beam system.

Electron beam systems may be used to convert contaminants, such as those found in soil and ground-water, to nontoxic forms. When contaminants are recovered from soil extractions then the toxic destruction is frequently termed "remediation." No two toxic waste sites are the same, however. Each site has different contaminants in varying amounts. In addition, requirements to clean up a site vary over time. The electron beam system can therefore be configured to meet the initial site requirements, then be transported to the site. When the site requirements change, the system can be reconfigured on site or removed for reconfiguration elsewhere. The entire system can be easily removed from the site when the cleanup is complete.

Figure 4:
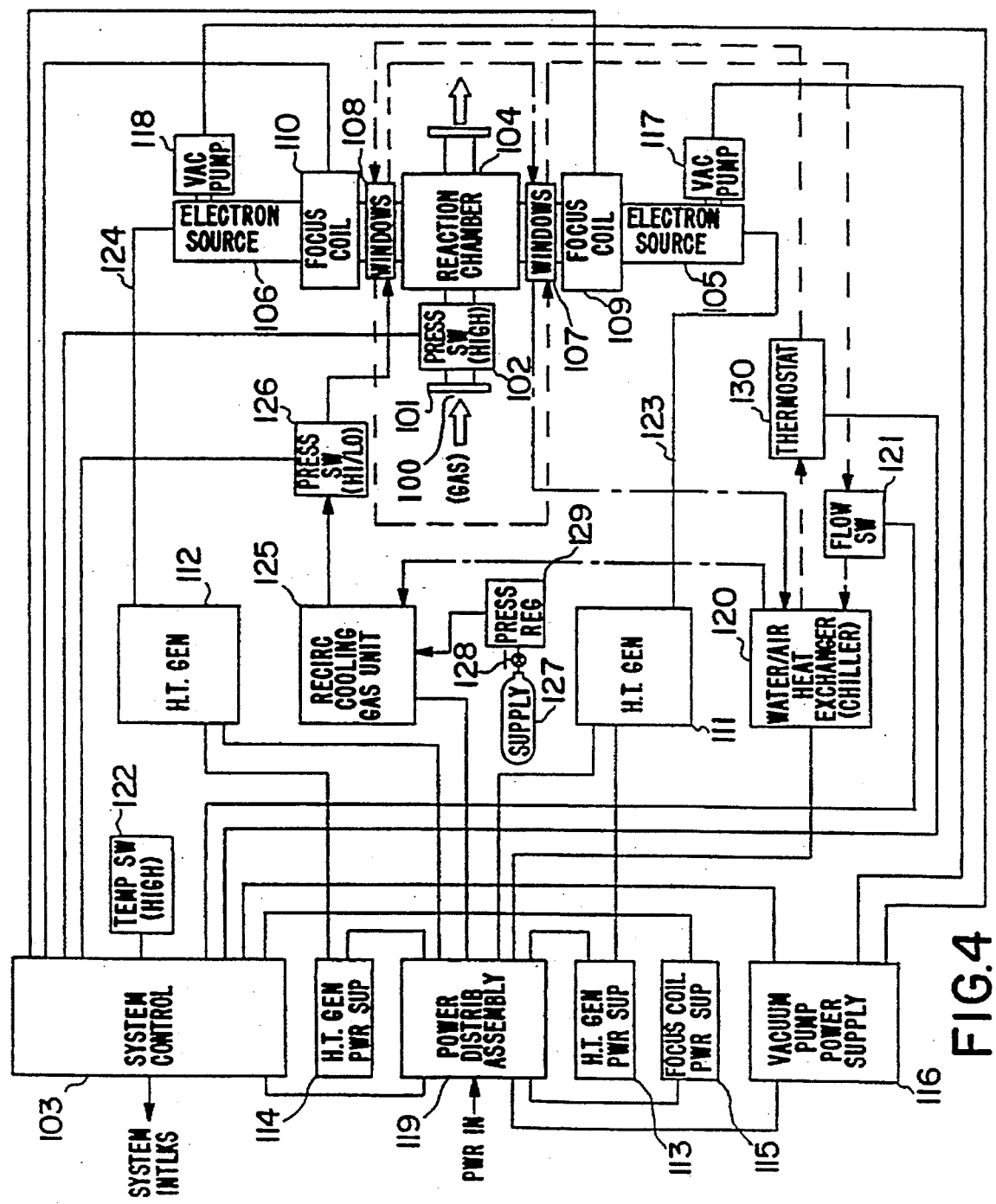
FIG. 4 is a block diagram of a preferred electron beam modular conversion system including system controls.

FIG. 4 is a simplified block diagram showing a preferred embodiment of a modular processing unit. This configuration includes two electron sources and one reaction chamber. Alternatively, only one electron source may be included or the system can be configured with more than two sources and more than a single reaction chamber.

One or more modular processing units, such as that of FIG. 4, will typically be employed as the central processor in a system which will also include, external to the processing unit, preprocessing elements and components such as pumps, valves, and filter, and postprocessing stations such as scrubbers and containers of activated charcoal.

Still referring to FIG. 4, a source 100 of a promoter is introduced into the gas preferably as it enters at flange 101. Species suitable for use as the promoter will be discussed and exemplified more fully hereinafter. The word "promoter" denotes the fact that the species introduced enhances, or promotes, the destruction of contaminant in the influent. Thus, the promoter and electron beam dose together are effective to destroy entirely (or at least to reduce significantly such as to a selected value) the amount of contaminant.

Although the source 100 of promoter preferably introduces promoter to the influent flow prior to entry of the gas being treated into the reaction chamber 104, it should be understood that promoter source 100 could directly introduce the promoter into the reaction chamber 104; however, this is less preferred, since introduction into the influent flow at or near flange 110 assists in distributing, or admixing, the promoter into the flow being treated.

An influent to be processed (such as, for example, contaminated air from a soil extraction system which is to be remediated, gas from an incinerator or from the output of an industrial process, or from carbon on which gas had been adsorbed, which are to be destroyed) thus has the promoter admixed in the gas stream preferably as it enters at flange 101, but at least as it is in the reaction chamber 104 during administration of the selected electron beam dose. If the pressure of the influent exceeds a predetermined limit beyond which the secondary window might be damaged, high-limit pressure switch 102 signals to system control assembly 103 which in turn signals control means external to the processing unit to reduce or stop the flow or otherwise reduce the incoming pressure. Alternatively, a control valve (not shown) can be included in the processing unit for this purpose.

Optionally, system control assembly 103 can contain means for delivering pulse signals to the optional control electrode or grid associated with the electron guns or filaments of electron sources 105 and 106. For a given average power, pulsing provides the capability of applying higher peak power to the influent flowing through the reaction chamber and such higher peak power can prove useful in those cases where the reaction rate depends on power levels or in cases where the material under treatment requires pulsing at higher peak power to accomplish an effective transformation.

While the influent is in reaction chamber 104, and more preferably as it flows through the reaction chamber 104, it is exposed to electron beams from one or more electron sources such as sources 105 and 106. Sources 105 and 106 direct beams through window assemblies 107 and 108, respectively. Focus coils 109 and 110, if employed, enable adjustments, for control of the electron beams, and to assure operation of the processing unit at an efficient level to transfer electron energy from the beams to the influent passing through reaction chamber 104.

In the configuration shown, electron sources 105 and 106, respectively, receive direct-current power (DC) via high tension cables 123 and 124 from high tension generators 11 and 112 which are controlled in turn by power control assemblies 113 and 114. Alternatively, more than one electron source can be driven by a single DC source of suitable capacity. The cathodes of electron sources 105 and 106 are heated by conventional electrical means (not shown).

Focus coil power supply 115 provides DC to focus coils 109 and 110 through system control assembly 103 which contains controls for focus adjustments. Alternatively, each focus coil can be fed by a separate power supply, and routing of each power supply to its focus coil can be direct rather than through a separate control assembly. It should be understood that the electron source can be designed so that no focus coil is required.

Electron sources 105 and 106 are equipped respectively with vacuum pumps 117 and 118 to assure that vacuums are maintained during operation and to extend operating life of the sources. Vacuum pump power supply 116 provides DC to the vacuum pumps. Alternatively, a separate power supply assembly can be used for each pump. As an option, these pumps and their power supplies can be omitted at some sacrifice to operating life.

Alternating-current power (AC) is introduced into the processing unit via power distribution assembly 119 which feed the AC to system elements that use AC. Conventional electrical interlocks may be included for personnel protection.

Refrigerated heat exchanger 120 supplies closed-loop flow of cooling liquid whose temperature is limited by thermostat 130. The liquid flows through cooling elements in window assemblies 108 and 107 and then is returned to heat exchanger 120. Flow switch 121 disables high tension power to electron sources 105 and 106 if water temperature exceeds a pre-set limit. Alternatively, other routing of cooling liquid can be employed. Temperature switch 122 limits operating temperatures within the processing unit enclosure.

Windows 108 and 109 are also cooled, in part, by recirculating gas which, in the preferred embodiment, is argon but alternatively could be another suitable dry, inert gas. Such use of an inert gas avoids formation of ozone, which could be formed if the electron beam interacted with air. This recirculating gas is cooled on passing through heat exchanger 120 flowing through recirculating gas window cooler 125. Cooling-gas pressure is controlled by regulator 129 and monitored by high-low pressure gauge 126 which signals the system control assembly 103 if pressure is outside the programmed limits so that processing unit operations may be discontinued until remedial action is taken. Replenishment of the recirculating gas is provided from supply bottle 127 through valve 128 and regulator 129.

Practice of the inventive process is preferably by use of the inventive apparatus whose preferred embodiments have been described above. However, an apparatus for use in practicing the inventive process with enhanced destruction of toxics can broadly be viewed as a reaction chamber, means associated with the reaction chamber for admitting an electron beam to treat an influent in said reaction chamber, and a source of promoter adapted to permit introduction of promoter into the influent, that is, to place promoter in fluid communication with the influent, before or at least when the influent is within the reaction chamber.

Suitable species for use as the promoter in practice of this invention are oxidizing agents that participate in an advanced oxidization process. Particularly preferred promoters include oxygen (or consist of oxygen), hydrogen, and carbon as atomic moieties, but preferably exclude other atoms since various other atoms, especially various halogenated compounds, may themselves pose removal problems. Preferred promoters are ozone, hydrogen peroxide, peracids, or mixtures of these.

If the promoter is selected to be ozone, then the ozone can be generated, for example, by an ozonator such as is known to the art. For example, U.S. Pat. No. 4,774,062, issued Sep. 27, 1988, inventor Heinemann describes a relatively small corona discharge ozonator that can be used to produce about 0.5 to about 2.25 kg of ozone per day and operates by flowing air through the device while using water as coolant.

It is important to understand that the inventive process requires inclusion of the selected promoter to enhance destruction. The promoter is in addition to weaker oxidizing agents that may be formed and thus be inherently present during practice of the process due to, for example, oxygen gas (which will be included when air is present). As was explained in the "Background" section of this application, when air is exposed to an electron beam, a wide spectrum of excited oxygen and nitrogen species is probably formed. Air can be present because it may have simply been entrained in the influent or because it may constitute the primary constituent or carrier of the influent.

When air is subjected to an electron beam within the reaction chamber, then some ozone and/or free radical promoting species will be formed. Nevertheless, the experimental data, such as is, for example, illustrated by FIGS. 5, 6, and 7, demonstrates that use of the promoter together with the electron beam can strikingly enhance destruction of some otherwise quite resistant contaminants.

Where hydrogen peroxide is selected as promoter, the hydrogen peroxide promoter can be introduced into the gas phase either as a liquid solution (e.g. injected or sprayed as droplets, a mist or aerosol) or by hydrogen peroxide vapor. Vapor, for example, may be produced by completely evaporating a hydrogen peroxide solution (such as a 1%–10% (wt/wt) solution). Vaporizing apparatus is well known to the art; for example, U.S. Pat. No. 4,847,469, issued Jul. 11, 1989, inventors Hofmann et al. describes a vaporizing apparatus useful for delivering a controlled flow of vapor into a plasma reaction chamber.

Further, the promoter can be a peracid (that is, a derivative of hydrogen peroxide with a directly linked pair of oxygen atoms). Some examples of peracids suitable for use in accordance with this invention include peracetic acid, performic acid, perproprioic acid, monopersuccinic acid, monopergluteric acid, and the like. These peracids are sufficiently volatile to form vapors at temperatures less than about 80° C. and thus can be introduced into the gas or vapor stream being treated in vapor form.

However, more typically where the promoter chosen is hydrogen peroxide or peracid, introduction of promoter can simply be as a liquid (e.g. an aqueous based solution) that is injected or sprayed into the influent. Thus, for example, when influent is flowed through the reaction chamber, the gas phase can be viewed as having entrained droplets of hydrogen peroxide promoter dispersed in the flow. Suitable apparatus for dispersing a liquid into a flowing gas or vapor stream are well known to the art.

The amount of promoter selected will usually vary, depending upon the concentration of contaminant in the gas phase and the electron beam dose selected for treatment. Of course, if one wished to adjust (dilute) the concentration, then air or another suitable carrier gas could be used. However, even small amounts of promoter have been found effective in increasing the destruction of particularly difficult contaminants. Typically a ratio will be selected where (for example, when using hydrogen peroxide) there are at least about one hydroxyl group to 20 carbon atoms of the volatile organic compound(s) present.

Mass balance analyses of gas samples treated by this invention after electron beam application showed good correlation between decreased inorganic concentration and increased concentration of HCl and carbon dioxide. Intermediate by-products such as chloroacetyl chloride and dichloroacetyl chloride were found to be below detection limits. With use of a promoter in accordance with the inventive process, the reduction in concentration of substantially all organic species tested has ranged from about 95% to more than 99% at a dose of 53 kilograys.

Appropriate doses will vary depending upon the scale of the apparatus used and the contaminant concentrations, among other factors anticipated. We determined dosages empirically for the bench scale system described under "Experimental" by plotting doses between about 1 to about 100 kilograys against VOC concentrations.

Residence times of the gas phase within the reaction chamber of the inventive apparatus will be determined by the time required to administer the selected dose. However, the free radical reactions involved in the inventive process are very fast compared to residence time.

EXPERIMENTAL

Samples were collected from three different well sources in 6-liter passivated canisters. All the collected samples were primarily air with a mixture of VOC contaminants. These collected samples were placed into Tedlar bags for electron beam treatment. Tedlar bags are porous, so the potential for escape of gases such as benzene and vinyl chloride is high. Therefore, immediately following electron beam treatment, the gases were transferred back to the passivated canisters. All untreated and treated samples were sent to a laboratory in passivated canisters for total VOC ("TO-14"), total carbon ("TO-12"), HCl, $CO_2$, $Cl_2$, and $NO_x$, analysis.

These samples included a number of different VOCs as contaminants, such as one or more of methylene chloride, acetone, benzene, methyl ethyl ketone, chloroform, xylene, 1,1-dichloroethene, toluene, 1,1,1-TCA, vinylchloride, ethylbenzene, 1,2,4-trimethylbenzene, 1,2-dichlorobenzene, Freon 113, and the like.

Each Tedlar bag held 2 liters of sample. Radiochromic film strips held in detector envelopes were used to measure the electron beam dose to each sample. Two film strips were placed on the front and two on the back near the center of each sample bag. Four more film strips were placed in the center of each outer edge of the bag.

Each sample bag was individually exposed to an electron beam source for a period of time to allow an appropriate electron dose to the sample. The dose to each sample was determined by using a radiochromic optical film reader. For high dose levels, the film optical density was read at 510 nm, and for low dose levels at 600 nm. The measured film optical density was compared to known standard curves to determine the electron beam dose received at each film strip. An average of the doses given to each of the 8 film strips was used as the dose given to the sample. A calculation was used to confirm that the average dose to the sample appeared reasonable based on known characteristics of the electron beam source. Measured average dose vs. time values were also plotted to make certain that the electron beam source had stable output over time.

Soil gas samples from two of the untreated soil gas samples were divided into six fractions of soil gases. Each of the fractions were subjected to a unique electron beam dosage. The third soil gas sample was divided into eight fractions. Six of the seven fractions were subjected to a unique electron beam dosage. The seventh fraction was treated within experimental capability with the same dose as the sixth fraction in the set. This sample was used as the process duplicate.

Promoter was added by injecting eight microliters of 30% hydrogen peroxide solution into each of the appropriate sample bags.

All experiments were carried out at ambient temperature and atmospheric pressure and no significant changes in either temperature or pressure were observed after application of electron beams. Radiation exposure times were held constant for all the samples.

Although concentrations of VOCs generally decreased as the doses increased, the reduction in concentration of certain contaminants even at the highest electron dosage were found to remain at about 50% without use of the promoter. The most intractable contaminants in these samples were 1,1,1-TCA, Freon 113, and mixed fuel hydrocarbons. However, with practice of the invention by introducing promoter, a substantial increase in removal efficiency was observed, for example, for 1,1,1-TCA and Freon 113 respectively.

Table 1 summarizes the reduction in concentration due to destruction of a number of species, with and without the inclusion of a promoter, where these VOC contaminants were converted into less toxic reaction products. The electron beam dose for all compositions treated with electron beam but without promoter was 59.2 kilograys. The electron beam dose for all compositions including promoter was 53.0 kilograys. The untreated compositions were used as controls (having had no applied electron beam and no promoter).

TABLE 1

| Contaminant | Beginning Conc. (ppmv) | Conc. (ppmv) and percent reduction after electron beam treatment (*) without promoter | | Conc. (ppmv) and percent reduction after electron beam treatment (**) with promoter | |
| --- | --- | --- | --- | --- | --- |
| DCA | 118 | 3 | 97.5% | 6 | 94.6% |
| 1,1-DCE | 1,998 | 37.8 | 98.1% | 0.4 | 100% |
| cis-1,2-DCE | 98.4 | 3.0 | 97% | 0 | 100% |
| vinylchloride | 35.7 | 3.0 | 91.7% | 0 | 100% |
| toluene | 94 | 1.5 | 98.4% | 0.6 | 99.4% |
| TCE | 570 | 3 | 99.5% | 0.5 | 99.9% |
| xylene | 6.5 | 1.5 | 77.2% | 0.3 | 95.4% |
| 1,1,1-TCA | 2,110 | 1,680 | 20.4% | 24 | 98.9% |
| Freon-113 | 267 | 180 | 32.6% | 13 | 99.6% |
| Total hydrocarbons | 22,000 | 5,930 | 73.1% | 100 | 99.6% |

(*) 59.2 kilograys
(**) 53.0 kilograys

As can be seen from the data of Table 1, in various instances destructions of the VOCs by electron beam were similar with and without inclusion of the promoter, although the electron beam dose levels for the treatments including the promoter were less. However, in the cases of 1,1,1-TCA, Freon-113, and total hydrocarbons, practice of the inventive process when promoter was present led to greatly improved removals and at lower electron beam dose levels.

Analysis of the gas samples after electron beam application showed close correlation between decrease in organic concentration and increase in the concentration of HCl and $CO_2$. The maximum concentration of HCl and $CO_2$ observed was in the order of 26,600 ppm and 92,000 ppm respectively. We conclude that these were the primary reaction products resulting from the treatments. $NO_x$ and $Cl_2$ were observed to range between 2.5 and 30 ppm and 2 to 10 ppm respectively. Intermediate by-products such as chloroacetyl chloride and dichloroacetyl chloride were below detection limits. Chlorotrifluoroethene and 3,3,3-trichloropropene were observed at 2.6 and 2.7 ppm respectively.

It is to be understood that while the invention has been described above in conjunction with preferred specific embodiments, the description and examples are intended to illustrate and not limit the scope of the invention, which is defined by the scope of the appended claims.

It is claimed:

1. A treatment process for remediating a target medium contaminated with one or more undesired compound(s) comprising:

providing a gaseous influent with a volatile organic compound contaminant;

adding one or more organic chemical oxidizing agent(s) to the influent; and, exposing the contaminant to an electron beam and reducing the concentration of the contaminant wherein the one or more chemical oxidizing agent(s) and the electron beam together enhance destruction of the contaminant.

2. The process as in claim 1 wherein the chemical oxidizing agent includes hydrogen peroxide.

3. The process as in claim 1 wherein the reduced level of contaminant is at least about a 95% removal value.

4. The process as in claim 3 wherein the influent includes air.

5. The process as in claim 1 wherein contaminant destruction is by formation of contaminant reaction product(s) including HCl, HF, and/or $CO_2$.

6. The process as in claim 2 wherein the hydrogen peroxide is liquid.

7. The process as in claim 6 wherein the hydrogen peroxide is entrained into the influent and then is flowed into a reaction chamber.

8. The process as in claim 1 wherein the influent is flowed into a reaction chamber with an amount of the chemical oxidizing agent dispersed therein.

9. A process for treating a volatile organic compound comprising:

providing a gaseous influent in a reaction chamber, the gaseous influent including at least one volatile organic compound as a contaminant, the gas phase having a chemical oxidizing agent as a reaction promoter therein; and, exposing the contaminant to an electron beam dose while the influent is within a reaction chamber to enhance destruction of the volatile organic contaminant(s) by reducing the concentration of contaminant via formation of one or more reaction product(s).

10. The process as in claim 9 wherein the promoter includes one or more of hydrogen peroxide, peracid, and ozone.

11. The process as in claim 9 wherein the promoter includes hydrogen peroxide.

12. The process as in claim 11 wherein the promoter is in a ratio of at least about 1:20 hydroxyl groups of the hydrogen peroxide to carbon atoms of the volatile organic compound.

13. The process as in claim 9 wherein the contaminant is a hydrocarbon and/or a halide substituted hydrocarbon.

14. The process as in claim 9 wherein the contaminant includes a fluorocarbon, a chlorofluorocarbon, a chlorocarbon or a mixture thereof.

15. The process as in claim 9 wherein the promoter and electron beam dose together are effective to reduce the concentration of volatile organic compound to at least about a 95% removal value.

16. The process as in claim 14 wherein the promoter is an oxidizing agent and the reaction product(s) include HX and/or $CO_2$, where X is fluorine or chlorine.

* * * * *